(No Model.)
B. N. EASTMAN & C. F. FINKBEINER.
GATE.
No. 294,861. Patented Mar. 11, 1884.
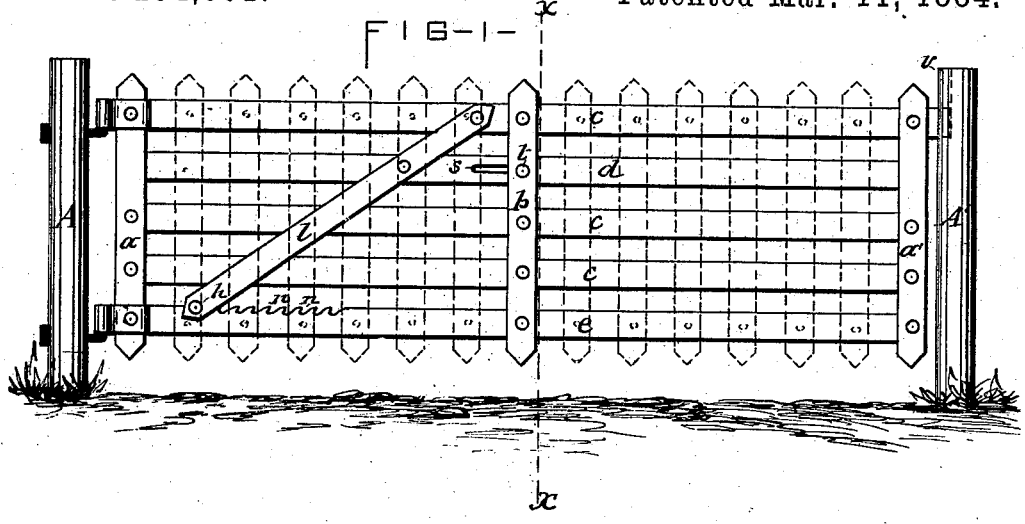
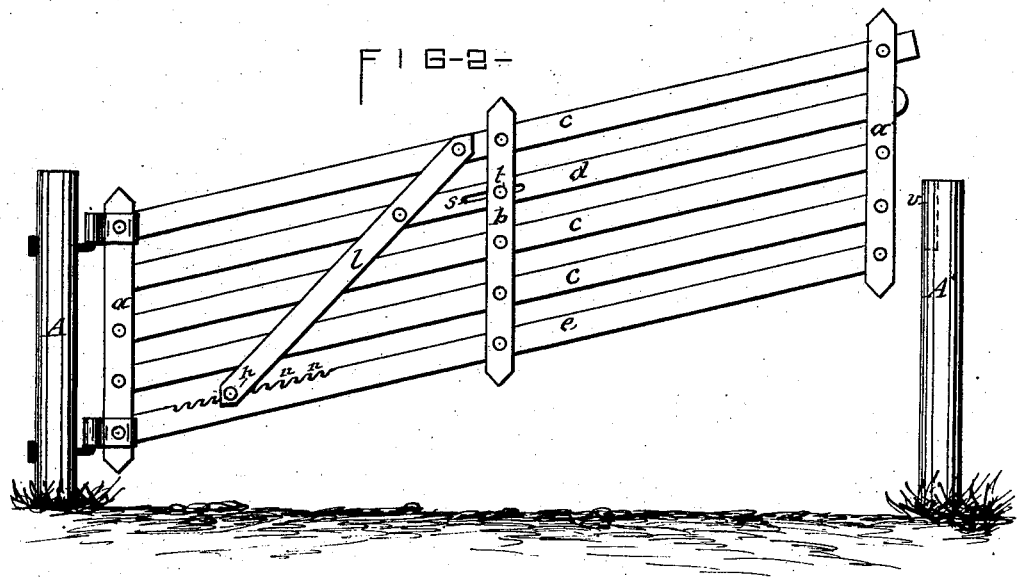
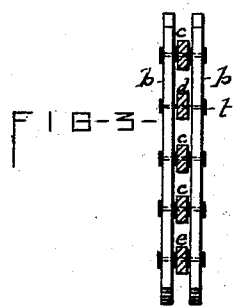
ATTEST—
Wm. E. Raymond.
C. Bendixon.
INVENTORS—
Benjamin N. Eastman
and Charles F. Finkbeiner
per Dull, Laass & H.
attys.

UNITED STATES PATENT OFFICE.

BENJAMIN N. EASTMAN AND CHARLES F. FINKBEINER, OF GEDDES, N. Y.

GATE.

SPECIFICATION forming part of Letters Patent No. 294,861, dated March 11, 1884.

Application filed October 3, 1883. (No model.)

*To all whom it may concern:*

Be it known that we, BENJAMIN N. EASTMAN and CHARLES F. FINKBEINER, of Geddes, in the county of Onondaga, in the State of New York, have invented new and useful Improvements in Gates, of which the following, taken in connection with the accompanying drawings, is a full, clear, and exact description.

This invention consists in the improved construction of a gate composed of horizontal bars pivoted to the stiles, so as to allow the free end thereof to be elevated and lowered at will to clear obstructions on the ground or to allow small live stock to pass underneath it without entirely opening the gate, and certain novel devices for sustaining the gate at its desired elevation, all as hereinafter more fully described, and specifically set forth in the claim.

In the annexed drawings, Figure 1 is a front view of the gate in its ordinary position. Fig. 2 shows the same adjusted for clearing obstructions on the ground and for allowing small live stock to pass underneath it, and Fig. 3 is a transverse section of the same on line $x\ x$ in Fig. 1.

Similar letters of reference indicate corresponding parts.

A and A' represent the two gate-posts, to one of which the gate is hinged, said gate being constructed as follows:

$a$ and $a'$ are the upright stiles at the two ends of the gate, and $b$ is a central or an intermediate stile. Each of said stiles is composed of two strips, between which are pivoted horizontal bars $c\ c\ c$ and $e$, so as to allow the free end of the gate to be elevated, as illustrated in Fig. 2 of the drawings, or lowered into its normal or horizontal position, as shown in Fig. 1. The top bar, $c$, is extended or made to project beyond the free end of the gate, so as to engage with a vertical groove, $v$, or other suitable catch on the post A'.

$d$ is a lever pivoted between the two strips of the central stiles, $b$, and oscillating with its free ends vertically between the strips forming the end stiles, said lever being arranged between two of the bars $c\ c$, and serving as one of the gate-bars. The connection of the lever $d$ with the central stile is made by a bolt, $t$, passing through the two strips of the stile, and through a horizontal slot, $s$, in the lever, which slot allows said lever to move longitudinally.

$l$ represents the diagonal brace of the gate, said brace consisting of two cleats hinged on opposite sides of the top bar, $c$, and connected with the lever $d$. The lower end of the brace is provided with a bolt, $h$, which ties the two cleats of the brace together, and rests with its intermediate portion in one of the series of notches $n\ n$, which are formed in the top edge of the bottom bar, $e$. By pressing down on the lever $d$ at the free end of the gate, the opposite end of said lever is caused to raise the lower end of the brace $l$ out of notch $n$, and when this is done the free end of the gate is allowed to drop.

When it is desired to raise the gate to avoid obstructions on the ground or to allow small live stock to pass underneath it, the same can be effected by simply raising the free end of the gate to the desired height. The weight of the brace causes the lower end thereof to drop automatically into one of the notches $n$ of the lower bar, $e$, and thus retain the gate in its elevated position.

If desired, pickets can be applied to this gate, as illustrated by dotted lines in Fig. 1 of the drawings, by connecting said pickets with the upper and lower bar of the gate by means of bolts passing through said parts.

Having described our invention, what we claim as new is—

In combination with the stiles $a$, $a'$, and $b$, and the bars $c\ c$, pivoted on said stiles, the lever $d$, pivoted on the central stile, the bar $e$, provided with notches $n\ n$, and the brace $l$, hinged on the top bar and connected with the lever $d$, and having its lower end adapted to engage with the notches $n\ n$, substantially as described and shown.

In testimony whereof we have hereunto signed our names and affixed our seals, in the presence of two attesting witnesses, at Syracuse, in the county of Onondaga, in the State of New York, this 26th day of September, 1883.

BENJAMIN N. EASTMAN. [L. S.]
CHARLES F. FINKBEINER. [L. S.]

Witnesses:
F. H. GIBBS,
WM. C. RAYMOND.